(12) United States Patent
Kim

(10) Patent No.: US 9,946,458 B2
(45) Date of Patent: Apr. 17, 2018

(54) METHOD AND APPARATUS FOR INPUTTING TEXT IN ELECTRONIC DEVICE HAVING TOUCHSCREEN

(71) Applicant: Samsung Electronics Co., Ltd., Suwon-si, Gyeonggi-do (KR)

(72) Inventor: Jihoon Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 870 days.

(21) Appl. No.: 14/242,263

(22) Filed: Apr. 1, 2014

(65) Prior Publication Data

US 2014/0310627 A1 Oct. 16, 2014
US 2017/0255356 A9 Sep. 7, 2017

(30) Foreign Application Priority Data

Apr. 3, 2013 (KR) .................. 10-2013-0036279

(51) Int. Cl.
| | |
|---|---|
| *G06F 17/21* | (2006.01) |
| *G06F 3/0488* | (2013.01) |
| *G06F 3/023* | (2006.01) |
| *G06F 3/0484* | (2013.01) |
| *G06F 17/27* | (2006.01) |
| *H04M 1/725* | (2006.01) |

(52) U.S. Cl.
CPC ........ *G06F 3/04886* (2013.01); *G06F 3/0237* (2013.01); *G06F 3/04847* (2013.01); *G06F 3/04883* (2013.01); *G06F 17/214* (2013.01); *G06F 17/276* (2013.01); *H04M 1/72552* (2013.01)

(58) Field of Classification Search
CPC ........ G06F 3/011; G06F 3/017; G06F 3/0237; G06F 3/0354; G06F 3/041; G06F 3/0488; G06F 3/04886; G06F 2203/04808; G06F 17/211; G06F 17/276; H04N 1/00381

See application file for complete search history.

(56) References Cited

U.S. PATENT DOCUMENTS

| | | | | |
|---|---|---|---|---|
| 5,347,295 A | * | 9/1994 | Agulnick ............... | G06F 1/1626 345/156 |
| 8,587,547 B2 | * | 11/2013 | Koch .................... | G06F 3/0488 178/18.01 |
| 8,645,863 B2 | * | 2/2014 | Mandic ................. | G06F 3/0481 715/768 |
| 8,812,973 B1 | * | 8/2014 | Cohen ................... | G06F 17/211 715/269 |

(Continued)

FOREIGN PATENT DOCUMENTS

| | | |
|---|---|---|
| EP | 1191428 B1 | 2/2009 |
| EP | 2469384 A1 | 6/2012 |

(Continued)

*Primary Examiner* — Alvin Tan
(74) *Attorney, Agent, or Firm* — Jefferson IP Law, LLP

(57) ABSTRACT

A method of inputting text in an electronic device having a touch screen is provided. The method includes displaying a screen including a keypad and a character input window, displaying a recommended text related to a character on a candidate window when an input of the character is detected through the keypad, detecting a gesture of a touch input according to the recommended text, and displaying a recommended text to which a style corresponding to the gesture is applied on the character input window.

12 Claims, 12 Drawing Sheets

(56) References Cited

U.S. PATENT DOCUMENTS

| | | | |
|---|---|---|---|
| 8,842,082 B2* | 9/2014 | Migos | G06F 3/04883 |
| | | | 345/173 |
| 9,417,754 B2* | 8/2016 | Smith | G06F 3/048 |
| 2005/0289452 A1* | 12/2005 | Kashi | G06F 17/2247 |
| | | | 715/232 |
| 2006/0132812 A1* | 6/2006 | Barnes | G06F 17/212 |
| | | | 358/1.11 |
| 2008/0036743 A1* | 2/2008 | Westerman | G06F 3/038 |
| | | | 345/173 |
| 2009/0077464 A1 | 3/2009 | Goldsmith et al. | |
| 2010/0225599 A1 | 9/2010 | Danielsson et al. | |
| 2010/0259482 A1 | 10/2010 | Ball | |
| 2012/0113023 A1 | 5/2012 | Koch et al. | |
| 2012/0223889 A1 | 9/2012 | Medlock et al. | |
| 2013/0249832 A1 | 9/2013 | Nakamura | |
| 2014/0278349 A1* | 9/2014 | Grieves | G06F 17/2735 |
| | | | 704/8 |

FOREIGN PATENT DOCUMENTS

| | | |
|---|---|---|
| JP | 2011-257941 A | 12/2011 |
| KR | 2010-0024566 A | 3/2010 |
| WO | 2012/132767 A1 | 10/2012 |

\* cited by examiner

METHOD AND APPARATUS FOR INPUTTING TEXT IN ELECTRONIC DEVICE HAVING TOUCHSCREEN

CROSS-REFERENCE TO RELATED APPLICATION(S)

This application claims the benefit under 35 U.S.C. § 119(a) of a Korean patent application filed on Apr. 3, 2013 in the Korean Intellectual Property Office and assigned Serial number 10-2013-0036279, the entire disclosure of which is hereby incorporated by reference.

TECHNICAL FIELD

The present disclosure relates to a method and an apparatus for inputting text in an electronic device. More particularly, the present disclosure relates to a method and an apparatus for inputting text in an electronic device having a touch screen in a simple and convenient manner.

BACKGROUND

Recently, the use of electronic devices including a touch screen has been gradually increased according to the development of technology. Therefore, the electronic devices provide various services and functions. Various functions, such as functions of phone, text message, email, word processing, camera, scheduling, and the like, are provided. Especially among the various functions, the email and word processing functions may be performed by inputting text.

Meanwhile, the electronic devices may have a structure of a full touch screen type in which a touch panel is arranged so as to substantially occupy the entire front surface of a display unit. The user can operate the touch screen so as to control the electronic devices and input text. When a user inputs text, an electronic device provides a text recommendation and style (e.g., underline, inclination, boldfacing, controlling a text size, or the like) application function based on the input text. Specifically, according to the text recommendation and style application function, when a user inputs characters, a recommended text candidate group related to the input characters appears. Then, the user can select and input a text from the candidate group, select again the input text through an editor, and then apply a style to the selected text. However, such a function requires various steps of inputting, which correspond to a cumbersome job.

That is, in inputting text of the electronic devices, a convenient text input scheme and a simple and convenient method for applying a style to written text are desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for text input, by which a user can input a text and apply a style in a simple and convenient manner without passing through a plurality of steps.

In accordance with an aspect of the present disclosure, a method of inputting text in an electronic device having a touch screen is provided. The method includes displaying a screen including a keypad and a character input window, displaying a recommended text related to a character on a candidate window when an input of the character is detected through the keypad, detecting a gesture of a touch input according to the recommended text, and displaying a recommended text to which a style corresponding to the gesture is applied on the character input window.

In accordance with another aspect of the present disclosure, an electronic device is provided. The electronic device includes a touch screen configured to detect a gesture of a touch input and to display a character input window and a keypad, and a controller configured to control the touch screen, wherein the controller detects an input of a character through the keypad, controls a recommended text related to the character to be displayed on a candidate window, detects a gesture of a touch input according to the recommended text, and controls a text to which a style corresponding to the gesture is applied to be displayed on the character input window.

As described above, the present disclosure provides a user interface that provides a recommended text candidate group in response to an input of text by a user and allows a simple and convenient text input including a style application through a gesture.

Further, the present disclosure provides a user interface that allows a simple and convenient text input, so as to shorten the text input time and thereby increase the use of an electronic device.

Also, according to the present disclosure, a style to be input is reflected in and displayed on a key label of a keypad. Therefore, a user can be previously aware of the style to be input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following detailed description, an electronic device according to the present disclosure may include a mobile communication terminal, a smart phone, a tablet Personnel Computer (PC), a hand-held PC, a Portable Multimedia Player (PMP), a Personal Digital Assistant (PDA), a note book PC, a desktop PC, and the like.

Figure 1:
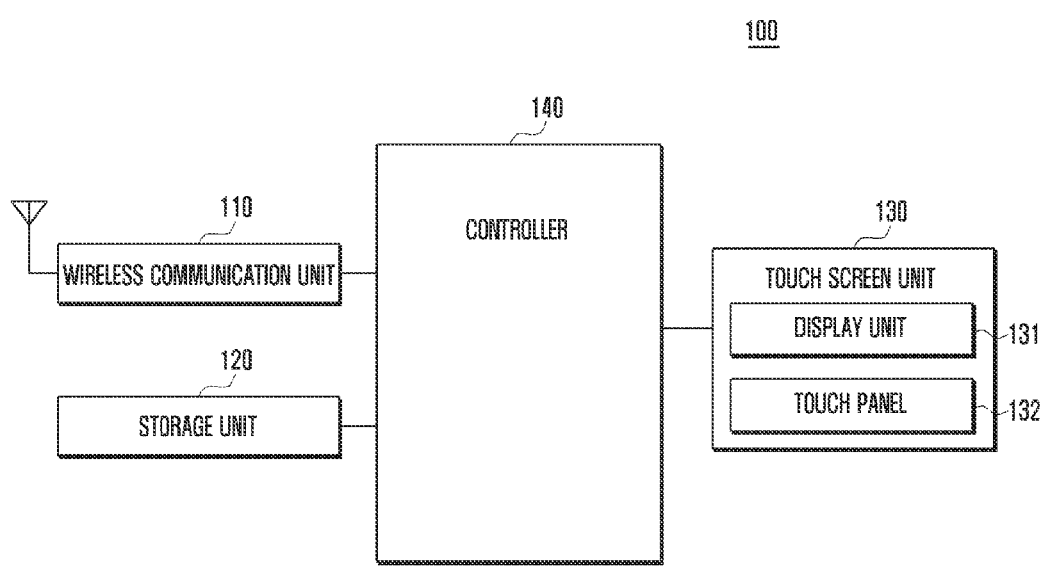
FIG. 1 is a block diagram illustrating a structure of an electronic device according to an embodiment of the present disclosure.

FIG. 1 is a block diagram illustrating a structure of an electronic device according to an embodiment of the present disclosure.

Referring to FIG. 1, an electronic device 100 of the present disclosure may include a wireless communication unit 110, a storage unit 120, a touch screen 130, and a controller 140.

The wireless communication unit 110 performs a voice communication, a video communication or a data communication with an external device through a network under a control of the controller 140. The wireless communication unit 110 may include a Radio Frequency (RF) transmitter for up-converting and amplifying a frequency of a transmitted signal, an RF receiver for low noise amplifying a received signal and down-converting a frequency, and the like. Further, the wireless communication unit 110 may include a mobile communication module (e.g., a 3rd Generation (3G) mobile communication module, a 3.5th Generation mobile communication module, a 4th Generation (4G) mobile communication module, and the like), a digital broadcasting module (e.g., a Digital Multimedia Broadcasting (DMB) module), and a short range communication module (e.g., a WiFi module, a Bluetooth module, a Near Field Communication (NFC) module, and the like).

The storage unit 120 may store a program and data required for operations of the electronic device 100 and may be divided into a program area and a data area. The program area may store a program controlling general operations of the electronic device 100, an Operating System (OS) booting up the electronic device 100, an application required to play multimedia contents, and other optional functions of the electronic device 100, for example, application programs required for a camera function, an audio play function, and an image or video play function. The data area is an area in which data generated or received according to use of the electronic device 100 is stored and may store an image, a video, a phone book, audio data, or the like.

Especially, the storage unit 120 according to the present disclosure may include a text database for recommending a text related to input characters. Further, the storage unit 120 may store a program for switching a recommended text candidate group display to a style candidate group display through a candidate window. In addition, the storage unit 120 may store text style information mapped to a gesture operation of a user.

The touch screen 130 may include a display unit 131 and a touch panel 132. The touch panel 132 may be located on the display unit 131. Specifically, the touch panel 132 may be implemented in an add-on type in which the touch panel is located on the display unit 131, or an on-cell type or an in-cell type in which the touch panel is inserted in the display unit 131.

The display unit 131 may display various screens, for example, a lock screen, a home screen, an execution screen of an application, a keypad screen, and the like, according to use of the electronic device 100 under the control of the controller 140. The display unit 131 may include a Liquid Crystal Display (LCD), an Organic Light Emitted Diode (OLED), an Active Matrix OLED (AMOLED), or a flexible display.

Especially, the display unit 131 according to the present disclosure may provide a character input window, a keypad for inputting characters, and a candidate window which displays a recommended text candidate group related to the characters, under the control of the controller 140. Further, the character input window may display a text input through the keypad and a style corresponding to a gesture operation detected in the candidate window. The style may include a font type, a character size, a character color, an attribute, or the like. The font type may include gulim type, dotum type, gungseo type, and batang type. However, the present disclosure is not limited to these types. The attribute may include boldfacing, inclination, underline, strikethrough, outline, shadow, embossment, intaglio, superscript, subscript, or the like. However, the present disclosure is not limited to these attributes.

The touch panel 132 may be a complex touch panel including a hand touch panel sensing a hand gesture and a pen touch panel sensing a pen gesture. Herein, the hand touch panel may be configured as a capacitive type touch panel. Of course, the hand touch panel may be configured as a resistive type touch panel, an infrared type touch panel, or an ultrasonic type touch panel. Further, the hand touch panel can generate a touch event through not only a hand gesture of the user but also other objects (e.g., objects of conductive materials which can make a change of capacitance). The pen touch panel may be configured as an electromagnetic induction type touch panel. Therefore, the pen touch panel generates a touch event by a stylus pen for a touch, which is specially made to form a magnetic field. The gesture is divided into a touch and a touch gesture. The touch gesture may include a tap, a double tap, a long tap, a drag, a drag and drop, a flick, a press, and a long press.

Especially, the touch panel 132 according to the present disclosure can detect a touch, a tap, a drag, a complex drag, and a long press by the user. Specifically, the touch refers to a gesture in which a user makes contact with a point of the touch screen 130 by using a touch input tool (e.g., a finger or a stylus pen). The tap refers to a gesture in which a touch input tool touches a point of the touch screen 130 and is then separated from the touched point without movement of the touched point on the touch screen. The drag refers to a gesture in which a touch input tool touches a point of the touch screen 130 and then moves in a direction while maintaining the state of touching the point. The long press refers to a gesture in which a touch input tool touches a point of the touch screen 130 and then maintains the pressing of the touched point for a threshold period of time.

The controller 140 controls general operations of the electronic device 100 and a signal flow between inner components of the electronic device 100, performs a data processing function, and controls a power supply from a battery to the components. The controller 140 may include a Central Processing Unit (CPU), a Graphic Processing Unit (GPU), and the like. The CPU refers to a fundamental control unit of a computer system which performs operation and comparison of materials, interpretation and execution of instructions, and the like. The GPU is a graphic control unit which performs, in place of the CPU, operation and comparison of materials, interpretation and execution of instructions, and the like, related to the graphic. In each of the CPU and the GPU, two or more independent cores (e.g., quad-cores) may be integrated into one package composed of a single integrated circuit. Further, the CPU and the GPU may be integrated into a single System on Chip (SoC). Also, the CPU and the GPU may be packaged into multiple layers. Meanwhile, a construction including the CPU and the GPU may be referred to as an Application Processor (AP).

Especially, the controller 140 according to the present disclosure may control a recommended text candidate group, which relates to a character input through a keypad displayed on the display unit 131, to be displayed on a candidate group window. Further, the controller 140 may display a sentence style candidate group on the candidate window according to a position of a cursor indicating an input position. In addition, the controller 140 may display a text, to which a style selected from the sentence style candidate group is applied, on a character input window. The controller 140 may distinguish a gesture (e.g., a drag, a tap, or the like) of a touch input, such as by the touch input tool, from the recommended text candidate group and control a style input and display corresponding to the distinguished gesture. Also, the controller 140 may cause a style, which is being input, to be reflected and displayed in a key label of the keypad.

Meanwhile, although not illustrated in FIG. 1, the electronic device 100 may selectively further include components having additional functions, such as a Global Positioning System (GPS) module for receiving location information, a broadcasting receiving module for a reception of broadcasting, a digital sound reproduction module like an Motion Picture Experts Group (MPEG)-2 Audio Layer III (MP3) module, a camera module for an image or a video filming or a video communication, and the like. While all possible components cannot be listed since they have various modifications according to the convergence trend of digital devices, the electronic device 100 according to the present disclosure may further include components equivalent to the above listed components.

Figure 2:
FIG. 2 illustrates an example of a screen supporting a text input according to an embodiment of the present disclosure.

FIG. 2 illustrates an example of a screen supporting a text input according to an embodiment of the present disclosure.

Referring to FIG. 2, a screen supporting a text input of the present disclosure may include a character input window 211, a candidate window 213 and a keypad 215. The screen supporting the text input may include all screens supporting a text input, such as writing a text message and an e-mail, and a messenger chatting window. The character input window 211 is an area displaying a character and a style in response to a user's gesture detection. The keypad 215 may detect the user's gesture and input a character at the position at which the gesture is detected, under the control of the controller 140. The candidate window 213 may display a recommended text candidate group related to an input character, under the control of the controller 140. Further, the keypad 215 may detect a user's gesture from the recommended text displayed on the candidate window 213 and input a text and a style corresponding to the detected gesture.

Figure 3:
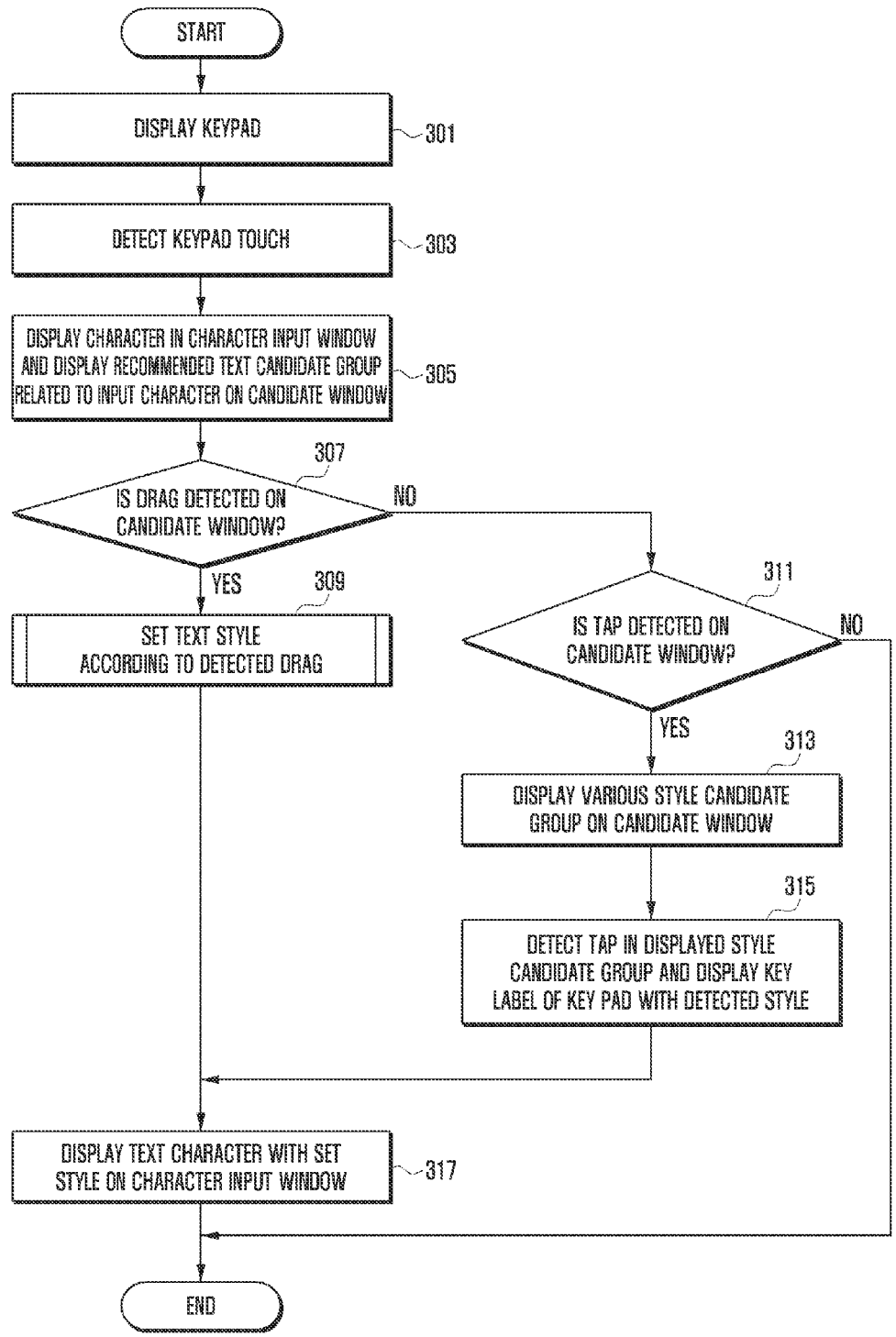
FIG. 3 is a flowchart illustrating a method of inputting text according to an embodiment of the present disclosure.

FIG. 3 is a flowchart illustrating a method of inputting a text according to an embodiment of the present disclosure.

Hereinafter, a more detailed description will be given with reference to FIG. 5 and FIGS. 7A to 7C.

Figure 5:
FIG. 5 illustrates an example of applying a sentence style according to an embodiment of the present disclosure.
Figure 6A:
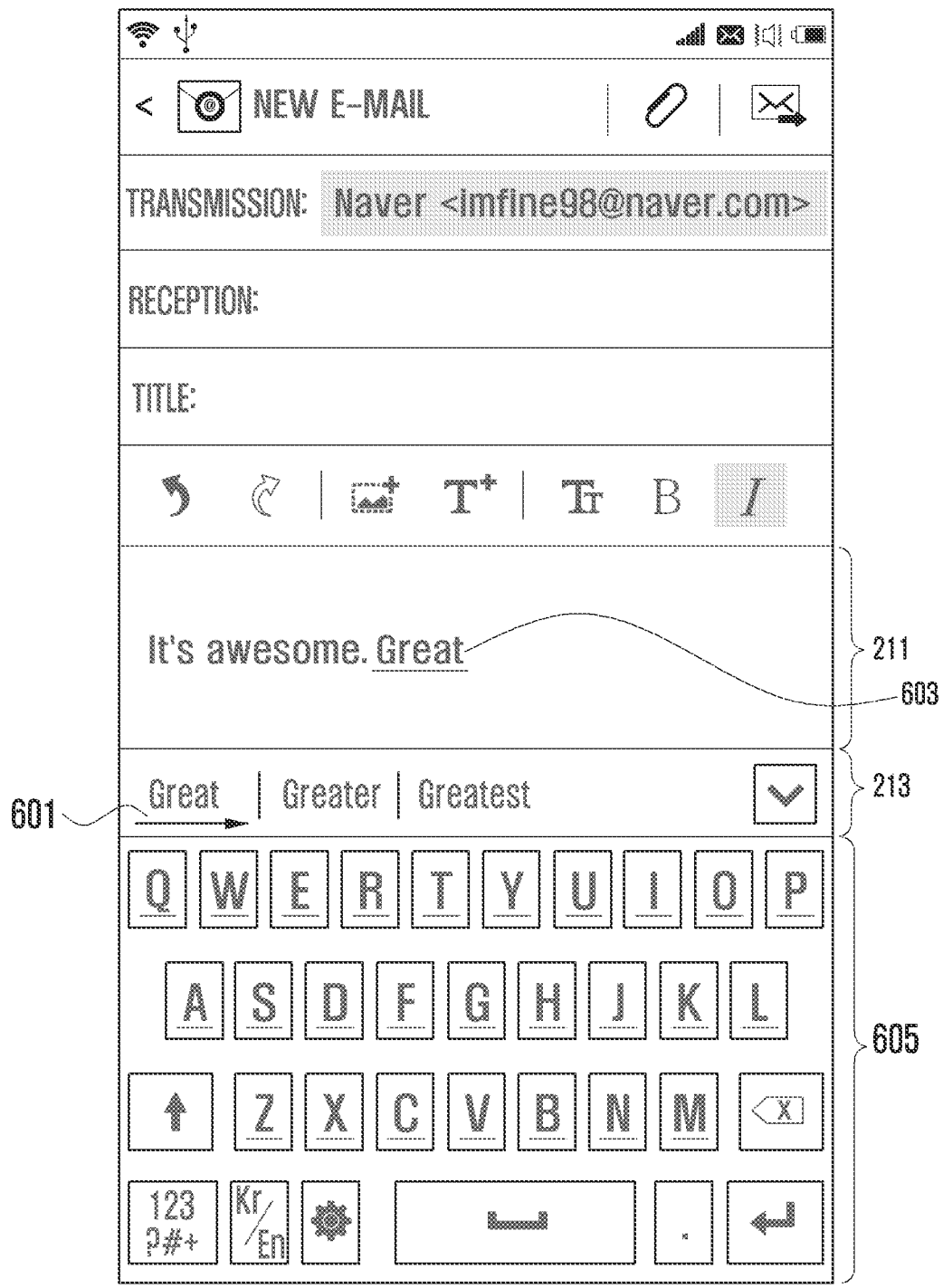
FIGS. 6A, 6B, 6C, and 6D illustrate examples of applying a text style according to a detected drag according to an embodiment of the present disclosure.
Figure 6B:
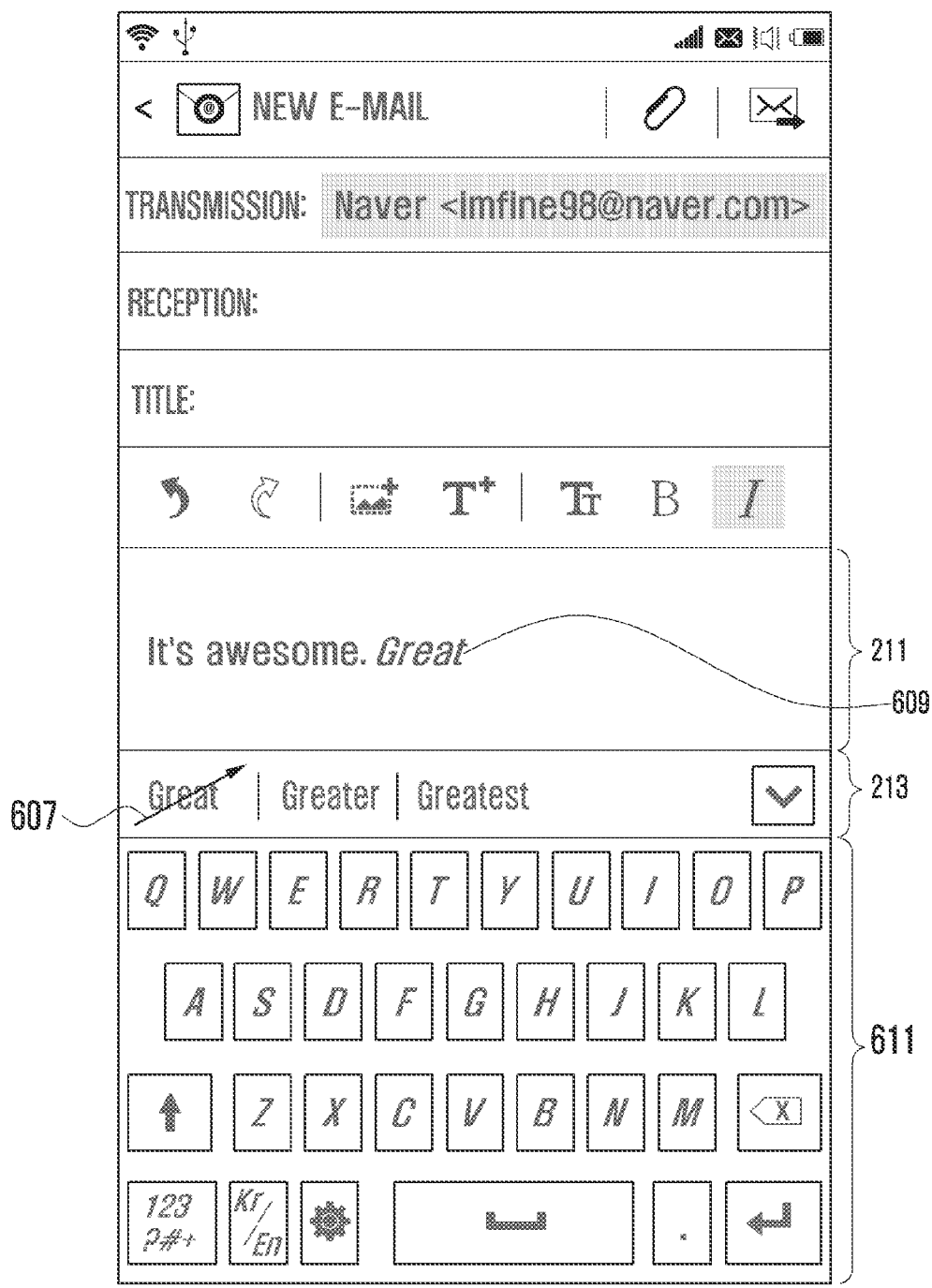
Figure 6C:
Figure 6D:

FIG. 5 illustrates an example of applying a sentence style according to an embodiment of the present disclosure.

Figure 7A:
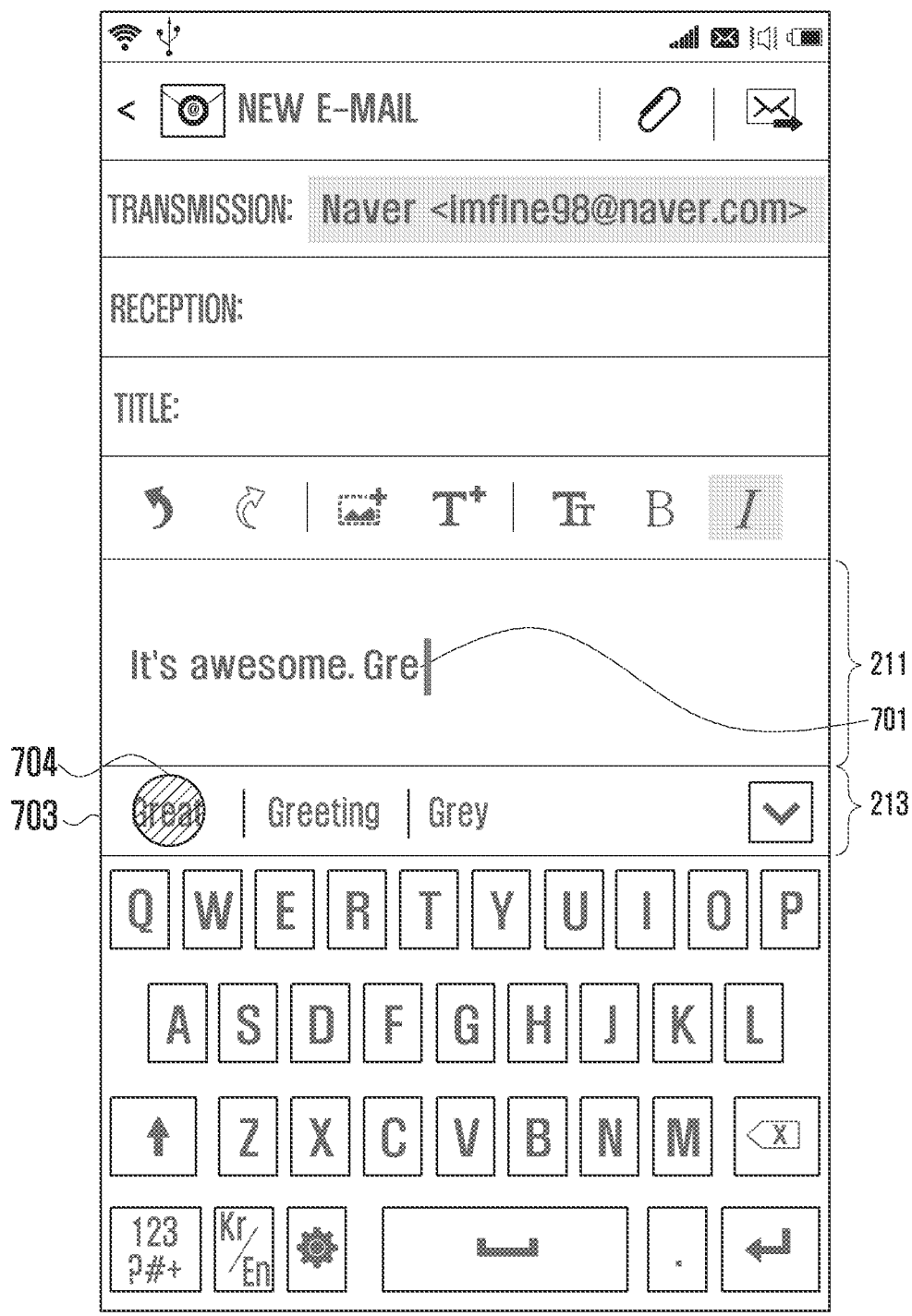
FIGS. 7A, 7B, and 7C illustrate examples of applying a text style according to a detected tap according to an embodiment of the present disclosure.
Figure 7B:
Figure 7C:

FIGS. 7A to 7C illustrate examples of an application of a text style according to a detected input.

Referring to FIG. 3, the controller 140 may detect an application selection corresponding to a text input screen through the touch panel 132. The application may include a character application, a mail application, a messenger application, and the like. When a selection of an application has been detected, the controller 140 executes the application and may control an application execution screen to be displayed on the display unit 131. The controller 140 may control a screen supporting a text input to be displayed on the display unit 131. As described above, the screen supporting a text input may include a character and/or e-mail writing screen and a messenger chat window, and the like. Further, the controller 140 can detect a text input request through the touch panel 132. In response to the text input request, the controller 140 may control the character input window 211, the candidate window 213 and the keypad 215 to be displayed on the display unit 131 in operation 301. At this time, the controller 140 may control a guide window, which describes a gesture operation generated on the candidate widow 213 and a style corresponding to the gesture operation, to be displayed on the display unit 131. Further, in response to the text input request, the controller 140 may control a cursor indicating an input position to be displayed in the character input window 211. When the cursor has been displayed, the controller 140 may display a sentence style candidate group 501 on the candidate window 213 as shown in FIG. 5. When a gesture has been detected from the displayed sentence style candidate group 501, the controller 140 may apply a style of the position, at which the gesture is detected, to the text desired to be input and then display the text on the character input window 211. Meanwhile, a sentence style can be changed by a user. Next, the controller 140 may detect a touch input of a touch input tool from the keypad 215 through the touch panel 132 in operation 303. In response to the detected touch input of the touch input tool, the controller 140 may control a character of the touch position detected from the keypad 215 to be displayed on the character input window 211 in operation 305. Further, the controller 140 may control a recommended text related to a character input on the character input window 211 to be extracted from a text database and be displayed on the candidate window 213. For example, when the user inputs the letter "G" in the keypad 215 through tapping using the touch input tool, the controller 140 may display "G" on the character input window 211 in response to the taping input. In this event, the controller 140 may extract a recommended text corresponding to "G" from the text database and display the extracted recommended text on the candidate window 213. Continually, when the user tap-inputs "r" from keypad 215 using the touch input tool, the controller 140 may display "Gr" on the character input window 211 in response to the tap input. Further, the controller 140 may extract a recommended text corresponding to "Gr" from the text database and display the extracted recommended text on the candidate window 213. In the same way, when the user tap-inputs "e", "a", and "t" from keypad 215 using the touch input tool in sequence, the controller 140 may display "Great" on the character input window 211 in response to the tap inputs. Further, the controller 140 may extract recommended texts related to "Great" from the text database and display "Great, Greater, Greatest" texts corresponding to the candidate group 501 on the candidate window 213.

Next, when the recommended text candidate group 501 has been displayed, the controller 140 may detect a gesture of the touch input tool, e.g., a drag, through the touch panel 132 from the recommended text candidate group in operation 307. When the detected gesture is a drag, the controller 140 can apply a style corresponding to a drag direction to the text to be input and then display the text to which the style has been applied on the character input window 211 in operation 309. When a drag in a direction from the left to the right has been detected, a text to which an underline style is applied may be displayed. When a drag in a diagonal direction has been detected, a text to which an inclination style is applied may be displayed. When a drag in a horizontal direction and then again in the opposite direction has been detected, a text to which a boldfacing style is applied may be displayed. When a drag in an upward or downward direction has been detected, a text adjusted to be larger or smaller than a pre-input text size may be displayed. However, the present disclosure is not limited to the examples described above.

Now, operations 309 and 317 of FIG. 3 will be described in more detail with reference to FIG. 4 and FIGS. 6A to 6D.

Figure 4:
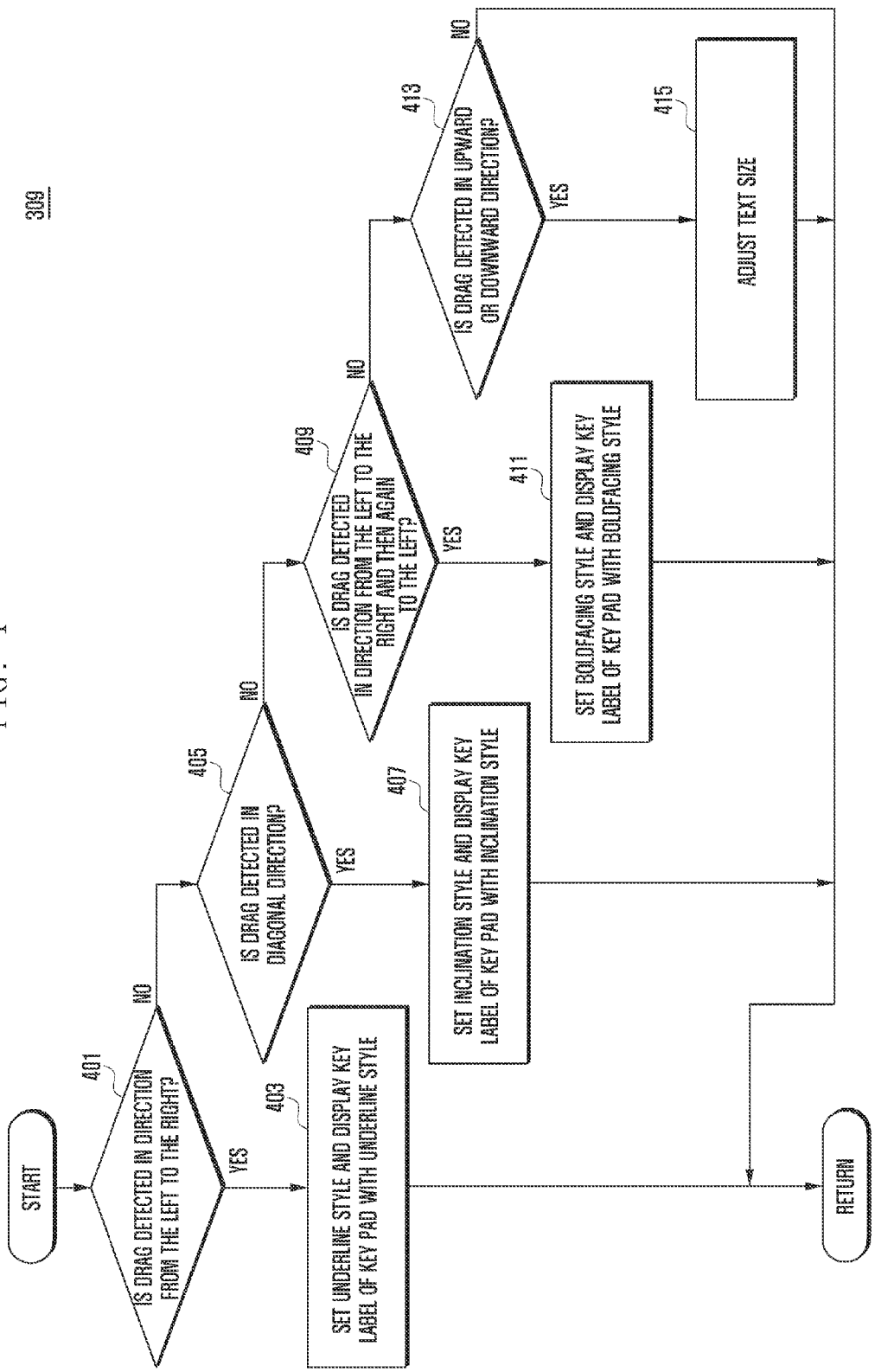
FIG. 4 is a flowchart illustrating a method of applying a text style by using a drag according to an embodiment of the present disclosure.

FIG. 4 is a flowchart illustrating a method of applying a text style by using a drag according to an embodiment of the present disclosure.

FIGS. 6A to 6D illustrate examples of application of a text style according to a detected drag according to an embodiment of the present disclosure.

Referring to FIG. 4, the controller 140 determines whether a drag in a horizontal direction, e.g., from the left to the right, is detected from a recommended text candidate group in operation 401. When the drag in the direction from the left to the right occurs, the controller 140 may display a text to which the underline style is applied on the character input window 211 in operation 403. In this event, the key label of the keypad may be displayed with the underline style reflected therein. For example, referring to FIG. 6A, when a user performs a drag operation in a direction from the left to the right by using the touch input tool on the recommended text candidate group "Great" displayed on the candidate window 213 as indicated by reference numeral 601, a text "Great" to which the underline style is applied is input on the character input window 211 as indicated by reference numeral 603, in response to the drag operation. Further, the key label of the keypad may be displayed with the underline style reflected therein as indicated by reference numeral 605.

Meanwhile, when a drag in the direction from the left to the right has not been detected, the controller 140 may determine whether a diagonal drag, e.g., in a direction from the bottom left to the top right, is detected in operation 405. When a drag operation in the diagonal direction occurs, the controller 140 may display a text to which the inclination style is applied on the character input window 211 in operation 407. In this event, the key label of the keypad may be displayed with the inclination style reflected therein. For example, referring to FIG. 6B, when a user generates a drag operation in the diagonal direction by using the touch input tool on the recommended text candidate group "Great" displayed on the candidate window 213 as indicated by reference numeral 607, a text "Great" to which the inclination style is applied may be input on the character input window 211 as indicated by reference numeral 609, in response to the drag operation. Further, the key label of the keypad may be displayed with the inclination style reflected therein as indicated by reference number 611.

When the drag in the diagonal direction has not been detected in operation 405, the controller 140 determines whether a drag in a horizontal drag direction from the left to the right and then again to the left is detected in operation 409. When the drag operation occurs, the controller 140 may display a text to which the boldfacing style is applied on the character input window 211 in operation 411. In this event, the key label of the keypad may be displayed with the boldfacing style reflected therein. For example, referring to FIG. 6C, when a user generates a horizontal drag operation in the direction from the left to the right and then again to the left by using the touch input tool on the recommended text candidate group "Great" displayed on the candidate window 213 as indicated by reference numeral 613, a text "Great" to which the boldfacing style is applied may be input on the character input window 211 as indicated by reference numeral 615, in response to the drag operation. Further, the key label of the keypad may be displayed with the boldfacing style reflected therein as indicated by reference numeral 617.

When the drag in the horizontal direction from the left to the right and then again to the left has not been detected, the controller 140 determines whether a drag in a vertical direction, e.g., an upward or downward direction, is detected in operation 413. When the drag in the upward or downward direction occurs, the controller 140 may adjust a text size in operation 415 and then display the adjusted text on the character input window 211. That is, the controller 140 may control the displayed text size to be adjusted larger or smaller by one increment and then be displayed. When a long press gesture occurs after dragging in the upward or downward direction, the controller 140 may display a text size adjusting slide at a point where the long press is detected. When the text size adjusting slide has been displayed, the controller 140 may control a size of text input on the character input window 211 to be adjusted to be larger or smaller and then be displayed through the drag operation in the upward or downward direction. For example, referring to FIG. 6D, when a user drags in the upward direction by using the touch input tool on the recommended text "Great" displayed on the candidate window 213, the controller 140 may adjust the text size to be larger and display the adjusted text on the character input window 211 as indicated by reference numeral 621, in response to the drag operation. When the long press occurs, the text size adjusting slide may be displayed as indicated by reference numeral 619. When the drag operation in the upward or downward direction occurs in the text size adjusting slide, in response to the drag operation, the text size may be applied to be larger or smaller and then displayed on the character input window 211.

Returning to the description of FIG. 3, the controller 140 may detect a user's gesture, e.g., a tap, through the touch panel 132 from the recommended text candidate group displayed on the candidate window 213 in operation 311. When the detected gesture is a tap, the controller 140 may control text to be switched into the text candidate group to which various styles are applied and displayed on the candidate window 213 in response to the detected tap in operation 313. The controller 140 may detect a tap through the touch panel 132 from various style text candidate groups displayed on the candidate window 213 in operation 315. Further, the controller 140 may control a key label of a keypad to be displayed with the detected style.

For example, referring to FIGS. 7A to 7C, when the user tap-inputs the letter "G" from keypad 215 using the touch input tool, the controller 140 may display "G" on the character input window 211 in response to the tap input. The controller 140 may extract a recommended text related to "G" from the text database and display the extracted recommended text on the candidate window 213. In the same way, when the user tap-inputs "r", "e" from keypad 215 using the touch input tool in sequence, the controller 140 may display "Gre" on the character input window 211 as indicated by reference numeral 701, in response to the tap input. Further, the controller 140 may extract a recommended text related to "Gre" from the text database and display, for example, "Great, Greeting, Grey" texts corresponding to the candidate group on the candidate window 213 as indicated by reference numeral 703. When "Great" text has been tap-input among the recommended text candidate group displayed on the candidate window 213 as indicated by reference numeral 704, "Great" may be switched into the candidate window 213 displaying the "Great" style candidate group to which various styles are applied and displayed as indicated by reference numeral 705, in response to the tap input. When "Great" with the underline style among the "Great" texts to which various styles are applied has been tap-input as indicated by reference numeral 706, "Great" with the underline style may be input on the character input window 211 as indicated by reference numeral 707. Further, a key label of a key pad may be displayed with the underline style reflected therein as indicated by reference numeral 711.

While the present disclosure has been shown and described with reference to various embodiments thereof, it will be understood by those skilled in the art that various changes in form and details may be made therein without departing from the spirit and scope the present disclosure as defined by the appended claims and their equivalents.

What is claimed is:

1. A method of inputting text in an electronic device comprising a touch screen, the method comprising:
    displaying a screen including a keypad, a character input window, and a candidate window;
    in response to a detection of an input of a character through the keypad, displaying recommended texts including the inputted character in the candidate window;
    detecting a gesture over a recommended text among the recommended texts, a style of the recommended text being determined based on a type of the gesture; and
    in response to detecting the gesture over the recommended text, displaying the recommended text, to which the determined style is applied, in the character input window.

2. The method of claim 1, wherein, when the gesture comprises a drag, the style is determined according to a direction of the drag.

3. The method of claim 2,
    wherein, when the gesture comprises a single horizontal drag, the style comprises an underline,
    wherein, when the gesture comprises a back and forth horizontal drag, the style comprises a boldface,
    wherein, when the gesture comprises a diagonal drag, the style comprises an inclination, and
    wherein, when the drag comprises a vertical direction, the style comprises adjusting a text size according to the drag.

4. The method of claim 3, wherein, when the vertical drag is maintained for a threshold period of time, a text size adjustment tool is displayed.

5. The method of claim 1, wherein the displaying of the recommended text in the character input window comprises displaying a text to which a style corresponding to a moving direction of the gesture is applied.

6. The method of claim 1, wherein the displaying of the screen comprises, when a cursor is displayed in the character input window, displaying a sentence style candidate group in the candidate window.

7. An electronic device comprising:
    a touch screen configured to display a character input window, a keypad, and a candidate window; and
    at least one processor configured to:
        detect an input of a character through the keypad,
        in response to the detection of the input of the character, control to display recommended texts including the inputted character in the candidate window,
        detect a gesture over a recommended text among the recommended texts, a style of the recommended text being determined based on a type of the gesture, and
        in response to detecting the gesture over the recommended text, control to display the recommended text, to which the determined style is applied, in the character input window.

8. The electronic device of claim 7, wherein, if the gesture comprises a drag, the style is determined according to a direction of the drag.

9. The electronic device of claim 8,
    wherein, if the gesture comprises a single horizontal drag, the style comprises an underline,
    wherein, if the gesture comprises a back and forth horizontal drag, the style comprises a boldface,
    wherein, if the gesture comprises a diagonal drag, the style comprises an inclination, and
    wherein, if the drag comprises a vertical direction, the style comprises adjusting a text size according to the drag.

10. The electronic device of claim 9, wherein, if the vertical drag is maintained for a threshold period of time, a text size adjustment tool is displayed.

11. The electronic device of claim 7, wherein the at least one processor is further configured to control a text, to which a style corresponding to a moving direction of the gesture is applied, to be displayed in the character input window.

12. The electronic device of claim 7, wherein the at least one processor is further configured to, when a cursor is displayed in the character input window, control a sentence style candidate group to be displayed.

* * * * *